(12) United States Patent
Uchiyama et al.

(10) Patent No.: US 7,843,496 B2
(45) Date of Patent: Nov. 30, 2010

(54) IMAGING DEVICE, METHOD OF RECORDING LOCATION INFORMATION, AND COMPUTER PROGRAM PRODUCT

(75) Inventors: Hiroaki Uchiyama, Kanagawa (JP); Naoki Tsunoda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 933 days.

(21) Appl. No.: 11/655,571

(22) Filed: Jan. 19, 2007

(65) Prior Publication Data

US 2007/0236581 A1  Oct. 11, 2007

(30) Foreign Application Priority Data

Jan. 23, 2006 (JP) .............................. 2006-014262
Dec. 1, 2006 (JP) .............................. 2006-325596

(51) Int. Cl.
H04N 5/76 (2006.01)
H04N 5/222 (2006.01)
G06F 19/00 (2006.01)

(52) U.S. Cl. .............................. 348/231.3; 348/333.02; 702/95

(58) Field of Classification Search ......... 348/135–158, 348/333.02
See application file for complete search history.

(56) References Cited

U.S. PATENT DOCUMENTS

| | | | | |
|---|---|---|---|---|
| 5,841,409 A | * | 11/1998 | Ishibashi et al. | 345/8 |
| 6,083,353 A | * | 7/2000 | Alexander, Jr. | 202/158 |
| 6,759,979 B2 | * | 7/2004 | Vashisth et al. | 342/357.13 |
| 7,567,282 B2 | * | 7/2009 | Vice | 348/333.02 |
| 2003/0182072 A1 | * | 9/2003 | Satoh et al. | 702/95 |
| 2004/0174434 A1 | * | 9/2004 | Walker et al. | 348/211.3 |
| 2005/0134716 A1 | * | 6/2005 | Vice | 348/333.02 |
| 2007/0162942 A1 | * | 7/2007 | Hamynen et al. | 725/105 |

FOREIGN PATENT DOCUMENTS

| | | |
|---|---|---|
| JP | 8-129216 | 5/1996 |
| JP | 9-135416 | 5/1997 |
| JP | 2004-357343 | 12/2004 |
| JP | 2005-311939 | 11/2005 |

OTHER PUBLICATIONS

Jul. 25, 2008 official action in connection with a counterpart Chinese patent application No. 2007100042926.

* cited by examiner

*Primary Examiner*—Jason Chan
*Assistant Examiner*—Pritham Prabhakher
(74) *Attorney, Agent, or Firm*—Cooper & Dunham LLP (57) ABSTRACT

A shooting-location acquiring unit acquires a current location, and stores acquired current location as a shooting location. A distance acquiring unit acquires a distance between a subject and the current location, and stores acquired distance as an imaging subject distance. An orientation acquiring unit acquires an orientation of the subject, and stores acquired orientation as an imaging subject orientation. A subject-location calculating unit calculates an imaging subject location, based on the shooting location, the imaging subject distance, and the imaging subject orientation. An information recording unit records an image with calculated imaging subject location.

8 Claims, 12 Drawing Sheets

IMAGING DEVICE, METHOD OF RECORDING LOCATION INFORMATION, AND COMPUTER PROGRAM PRODUCT

CROSS-REFERENCE TO RELATED APPLICATIONS

The present document incorporates by reference the entire contents of Japanese priority document, 2006-14262 filed in Japan on Jan. 23, 2006 and 2006-325596 filed in Japan on Dec. 1, 2006.

BACKGROUND

1. Technical Field

This disclosure relates to an imaging device that can acquire a shooting location, a distance, a direction, and a high-angle up to a subject at the time of shooting an image, and a method and a program for recording location information.

2. Description of the Related Art

Recently, use of a geographical information system (GIS), used for acquiring location information, is widening along with the prevalence of portable global positioning system (GPS) receivers. The GIS is used for various purposes, for example, survey of fire disasters, real estate, road repairs, and the likes, and the demand is predicted to grow in the future.

The same system is also useful in a digital camera, for example, shooting an image of a fire disaster site with the digital camera helps in writing a report related to the disaster at a later stage, because, map data acquired from the GIS during the survey of the fire disaster site can be associated with the image. Thus, there is a need to establish a relation between the image taken by the digital camera and the location information acquired from the GIS.

In response to such a need, a technology relating to the digital camera, connected to a GPS receiver, is published in Japanese Patent Application Laid-Open No. 2004-357343. The location information, received from the GPS receiver, is inputted into the digital camera, and is included in a header portion of the image, taken by the digital camera.

According to a conventional technique the location information of the image is recorded in the same image file and that improves management of the image, however, depending on the condition of a place it is not possible to get closer to a subject. Thus, when the place of taking the image and the imaging subject are distant from each other, it is not possible to capture exact location information of the subject.

BRIEF SUMMARY

In an aspect of this disclosure, there is provided an imaging device that includes a storing unit configured to store therein information; a shooting-location acquiring unit that acquires a current location of the imaging device from a location detecting device that detects the current location; and stores acquired current location in the storing unit as a shooting location; a distance acquiring unit that acquires a distance between a subject and the current location from a distance measuring unit that measures the distance, and stores acquired distance in the storing unit as an imaging subject distance; an orientation acquiring unit that acquires an orientation of the subject with respect to the current location as a reference from an orientation measuring device that measures the orientation, and stores acquired orientation in the storing unit as an imaging subject orientation; a subject-location calculating unit that calculates an imaging subject location that is a location of the imaging subject, based on the shooting location, the imaging subject distance, and the imaging subject orientation; and an information recording unit that records a shot image with calculated imaging subject location.

In another aspect, there is provided a method of recording location information that includes acquiring a current location of an imaging device from a location detecting device that detects the current location; storing acquired current location in a storing unit as a shooting location; acquiring a distance between a subject and the current location from a distance measuring unit that measures the distance; storing acquired distance in the storing unit as an imaging subject distance; acquiring an orientation of the subject with respect to the current location as a reference from an orientation measuring device that measures the orientation; storing acquired orientation in the storing unit as an imaging subject orientation; calculating an imaging subject location that is a location of the imaging subject, based on the shooting location, the imaging subject distance, and the imaging subject orientation; and recording a shot image with calculated imaging subject location.

In another aspect, there is provided a computer program product that includes a computer usable medium having computer readable program codes embodied in the medium that when executed cause a computer to execute acquiring a current location of an imaging device from a location detecting device that detects the current location; storing acquired current location in a storing unit as a shooting location; acquiring a distance between a subject and the current location from a distance measuring unit that measures the distance; storing acquired distance in the storing unit as an imaging subject distance; acquiring an orientation of the subject with respect to the current location as a reference from an orientation measuring device that measures the orientation; storing acquired orientation in the storing unit as an imaging subject orientation; calculating an imaging subject location that is a location of the imaging subject, based on the shooting location, the imaging subject distance, and the imaging subject orientation; and recording a shot image with calculated imaging subject location.

The above and other aspects, features, advantages and technical and industrial significance will be better understood by reading the following detailed description of presently preferred embodiments of the present invention, when considered in connection with the accompanying drawings.

DETAILED DESCRIPTION OF THE PREFERRED EMBODIMENTS

Exemplary embodiments according to the present invention will be explained in detail below with reference to the accompanying drawings. Although the present invention has been described with respect to a specific embodiment of the imaging device, that is, a digital camera, the application of the present invention is not necessarily limited to the digital camera, and can be applied to other imaging devices, for example, a portable terminal and the likes.

Figure 1:
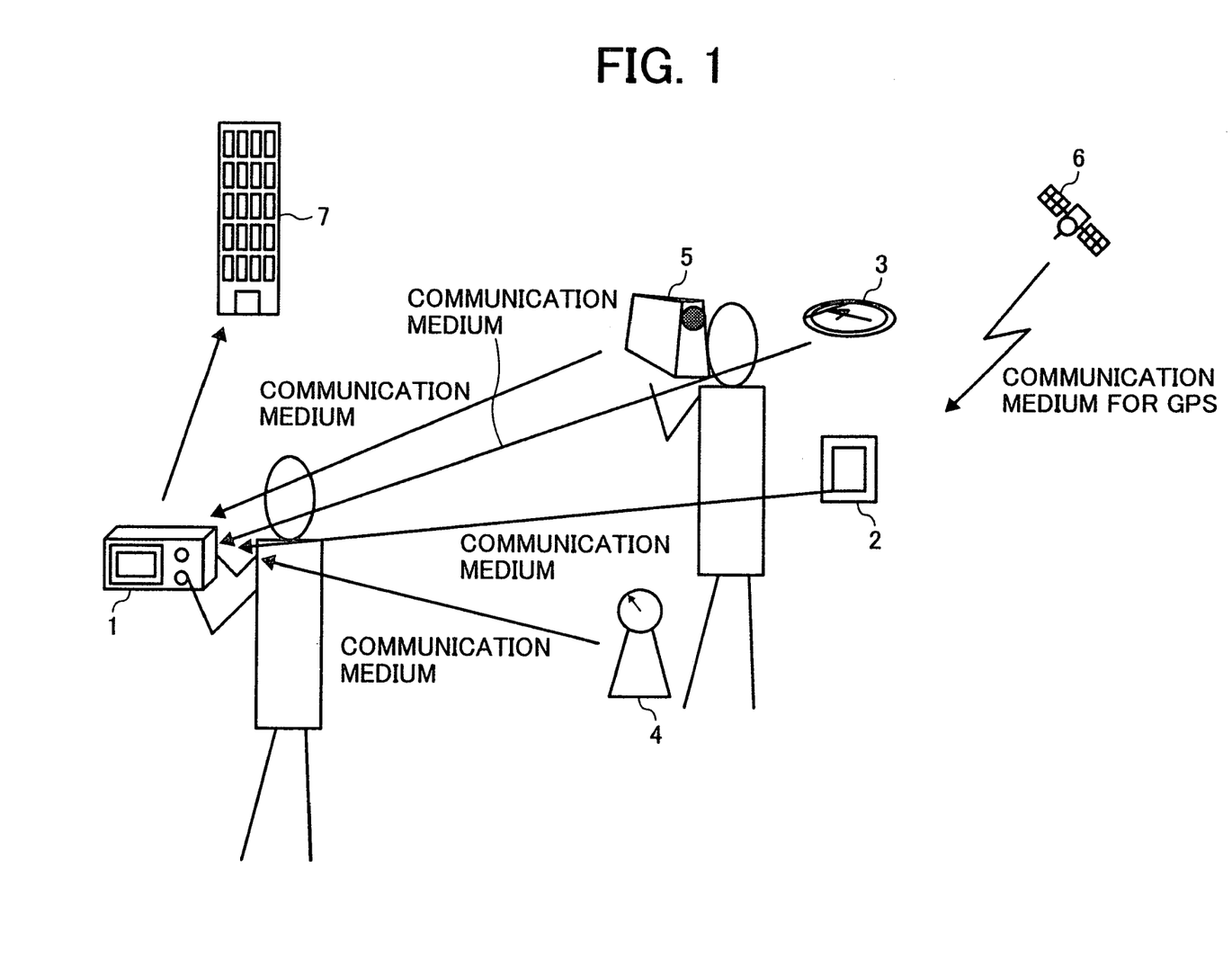
FIG. 1 is a schematic for explaining a configuration of an image processing system according to an embodiment of the present invention.

FIG. 1 is a schematic for explaining a configuration of an image processing system according to an embodiment of the present invention. The image processing system includes a digital camera 1, a GPS receiver 2, an electronic compass 3, a high-angle gauge 4, and a range finder 5. The GPS receiver 2, the electronic compass 3, the high-angle gauge 4, and the range finder 5 use a wireless transmission equipment compatible with the Bluetooth (registered trademark) standards as a communication equipment.

The GPS receiver 2 uses a GPS satellite 6, used for acquiring location information, for detecting current location, and includes the wireless transmission equipment compatible with the Bluetooth (registered trademark) standards for transmitting detected location information to the digital camera 1.

The electronic compass 3 is for finding out direction of an imaging subject 7 from a shooting location. The high-angle gauge 4 is for measuring a high-angle formed between the shooting location and the imaging subject 7. The electronic compass 3, the high-angle gauge 4, and the range finder 5 send the resultant measurements to the digital camera 1 through the wireless transmission equipment compatible with Bluetooth (registered trademark) standards.

As shown in FIG. 1 according to the present embodiment, a person other than a person who is holding the digital camera 1 holds the range finder 5 in the vicinity, and in the vicinity of the person holding the range finder 5 are placed the high-angle gauge 4, the electronic compass 3, and the GPS receiver 2. The usage is not limited to the particular formation. It is possible for one person to hold the digital camera 1 and the range finder 5 as well, and place the high-angle gauge 4, the electronic compass 3, and the GPS receiver 2 in the vicinity.

Figure 2:
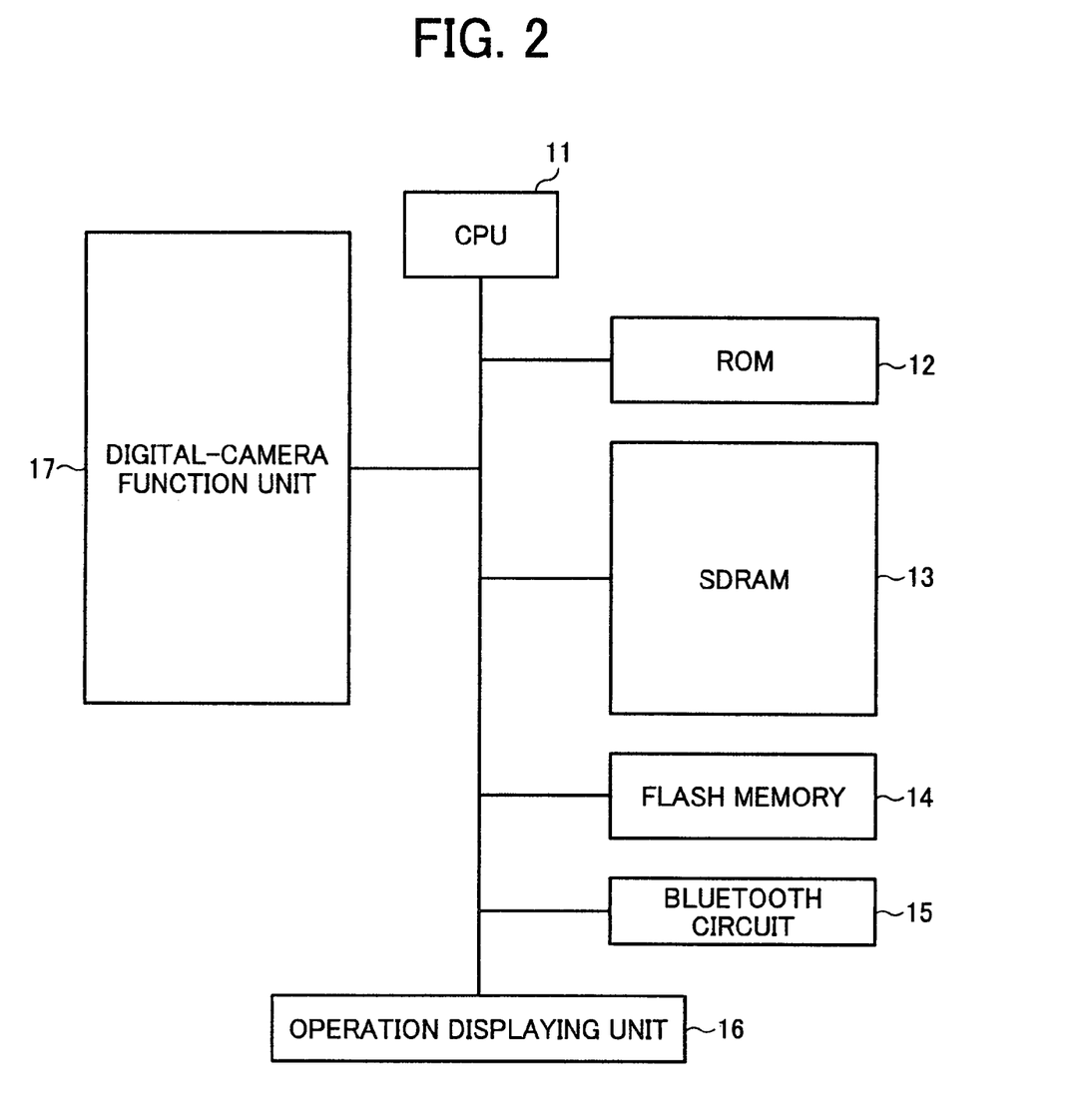
FIG. 2 is a block diagram of a hardware configuration of a digital camera according to the present embodiment.

FIG. 2 is a block diagram of a hardware configuration of the digital camera 1 according to the present embodiment. As shown in FIG. 2, the digital camera 1 includes a central processing unit (CPU) 11, a read only memory (ROM) 12, a synchronous dynamic random access memory (SDRAM) 13, a flash memory 14, a Bluetooth (registered trademark) circuit 15, an operation displaying unit 16, and a digital-camera function unit 17.

The CPU 11 controls the digital camera 1. The ROM 12 stores programs that can execute processes included according to the present embodiment. The flash memory 14 is a storing medium that stores information related to settings of the digital camera 1, information related to settings of use modes, and image data. The Bluetooth (registered trademark) circuit 15 is a communication circuit that makes wireless transmission possible through a communication method, which is compatible with the Bluetooth (registered trademark) standards, and is used as a communication device for acquiring location information from the GPS receiver 2. The operation displaying unit 16 is an interface that includes a liquid crystal display, a key button, a shutter button, and a mode dial, and can display the image or every type of display screen, and is able to operate according to input from a user. The digital-camera function unit 17 performs imaging function and location information recording function.

The SDRAM 13 is a storing medium, which stores a shooting location, an imaging subject distance, an imaging subject orientation an imaging subject high-angle, an imaging subject location. The information stored in the SDRAM 13 is acquired via the Bluetooth (registered trademark) circuit 15.

Figure 3:
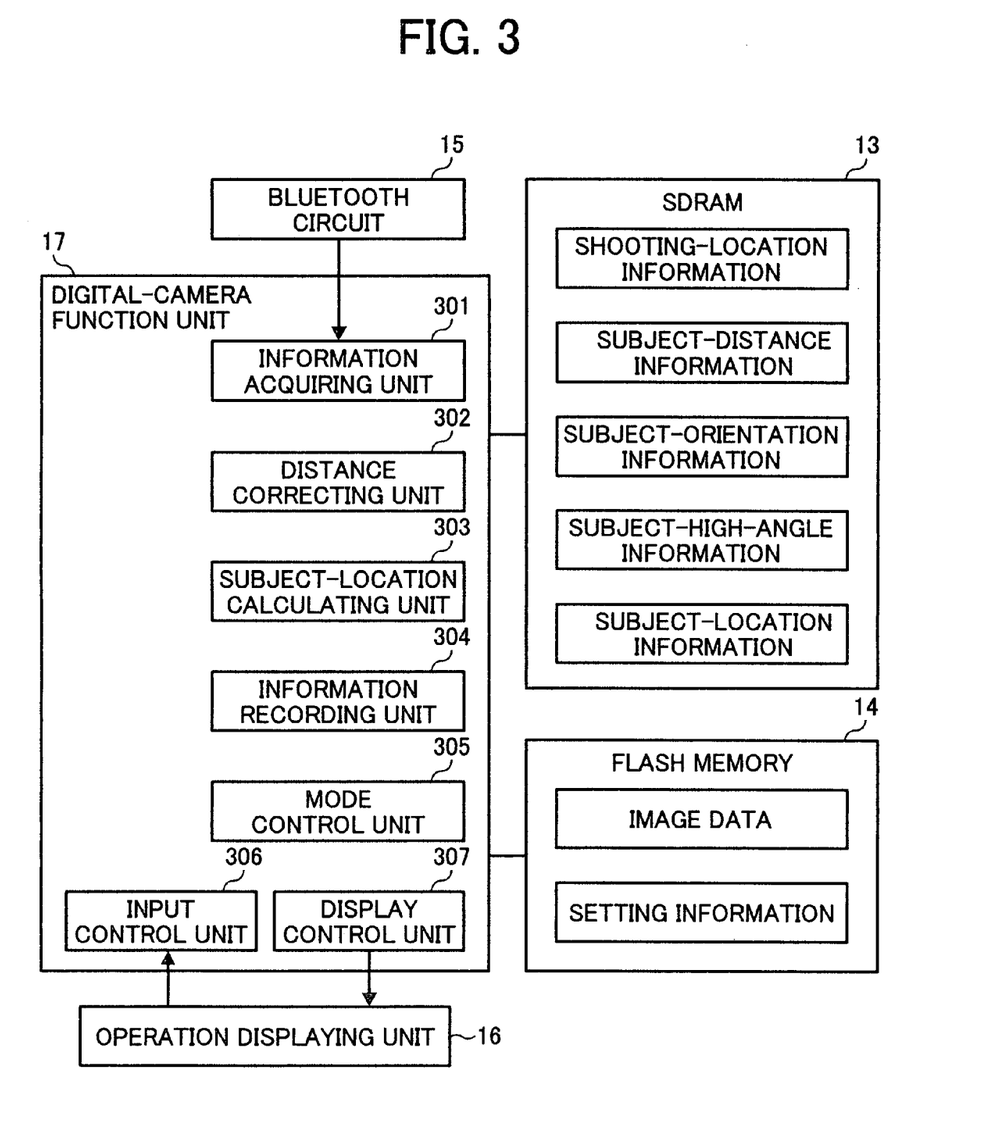
FIG. 3 is a functional block diagram of a digital-camera function unit.

FIG. 3 is a functional block diagram of the digital-camera function unit 17. As shown in FIG. 3, the digital-camera function unit 17 includes an information acquiring unit 301, a distance correcting unit 302, an imaging-subject-location calculating unit 303, an information recording unit 304, a mode control unit 305, an input control unit 306, and a display control unit 307.

The information acquiring unit 301 is a processing unit that acquires current shooting location from the GPS receiver 2 via the Bluetooth (registered trademark) circuit 15, and stores acquired location in the SDRAM 13, thus, working as a shooting-location acquiring unit; works as a distance acquiring unit by acquiring from the range finder 5 the distance between the shooting location and the imaging subject via the Bluetooth (registered trademark) circuit 15, and saving the same in to the SDRAM 13 as an imaging subject distance; works as a orientation acquiring unit by acquiring direction of the imaging subject from the electronic compass 3 via the Bluetooth (registered trademark) circuit 15, taking the shooting location as the basis of finding direction, and stores the same in the SDRAM 13 as an imaging subject orientation.

Further, the information acquiring unit 301 acquires a high-angle between the shooting location and the imaging subject from the high-angle gauge 4 via the Bluetooth (registered trademark) circuit 15, stores the same in the SDRAM 13 as an imaging subject high-angle, thus, working as a high-angle acquiring unit.

The distance correcting unit 302 is a processing unit that calculates a horizontal distance from the imaging subject distance and the imaging subject high-angle, stored in the SDRAM 13, to the imaging subject, as the correction distance. Specifically, the distance correcting unit 302 assesses whether all information about imaging subject distances and imaging subject high-angles are stored in the SDRAM 13 or not, in other words, whether all information about imaging subject distances and imaging subject high-angles are acquired or not, and if all are stored, the correction distance is calculated accordingly.

The imaging-subject-location calculating unit 303 is a processing unit that calculates the imaging subject location from the shooting location, the imaging subject distance, and the imaging subject orientation that is stored in the SDRAM 13.

In case a recording mode is set to subject calculation mode, the imaging-subject-location calculating unit 303 assesses whether all information about shooting locations, imaging subject orientations, and imaging subject distances are stored in the SDRAM 13 or not, in other words, whether all information about shooting locations, imaging subject orientations, and imaging subject distances are acquired or not, and incase all are stored in the SDRAM 13, calculates the imaging subject location.

Further, in case the correction distance is calculated by the distance correcting unit 302, the imaging-subject-location calculating unit 303 takes the correction distance as the imaging subject distance and calculates the imaging subject location. On the other hand, in case the recording mode is set to no subject calculation mode, the imaging-subject-location calculating unit 303 does not calculate the imaging subject location.

Following is an explanation about recording modes. The recording modes are modes that denote whether the imaging subject location, which is a correct location information about the imaging subject, is to be calculated. The subject calculation mode is a mode that calculates the imaging subject location at the time of taking the image, and a no calculation mode is a mode that does not calculate the imaging subject location at the time of taking the image, however, records resultant measurements only on to a header portion of image data. The recording mode is set up to any one of the modes on a set-up screen of the digital camera, beforehand, by the user, and the set up mode is stored in the flash memory 14 as setting information. The imaging-subject-location calculating unit 303 refers to contents of the setting information stored in the flash memory 14, and assesses whether the recording mode is set to the subject calculation mode or the no subject calculation mode.

The mode control unit 305 is a processing unit that stores the recording mode, selected by the user, in the flash memory 14 as the setting information, and executes change of recording mode.

The information recording unit 304 is a processing unit that records the imaging subject location calculated by the imaging-subject-location calculating unit 303, on to an exchangeable image file format (Exif) header portion of image data. Further, the information recording unit 304 records the shooting location, the imaging subject distance, the imaging subject orientation, and the imaging subject high-angle on to the Exif header portion of the image data. The information recording unit 304 stores in the flash memory 14, the image data, such as the imaging subject location, the shooting location, the imaging subject distance, the imaging subject orientation, and the imaging subject angle recorded on to the Exif header portion. Thus, the image is stored in the flash memory 14 along with the imaging subject location, the shooting location, the imaging subject distance, the imaging subject orientation, and the imaging subject angle.

Figure 4:
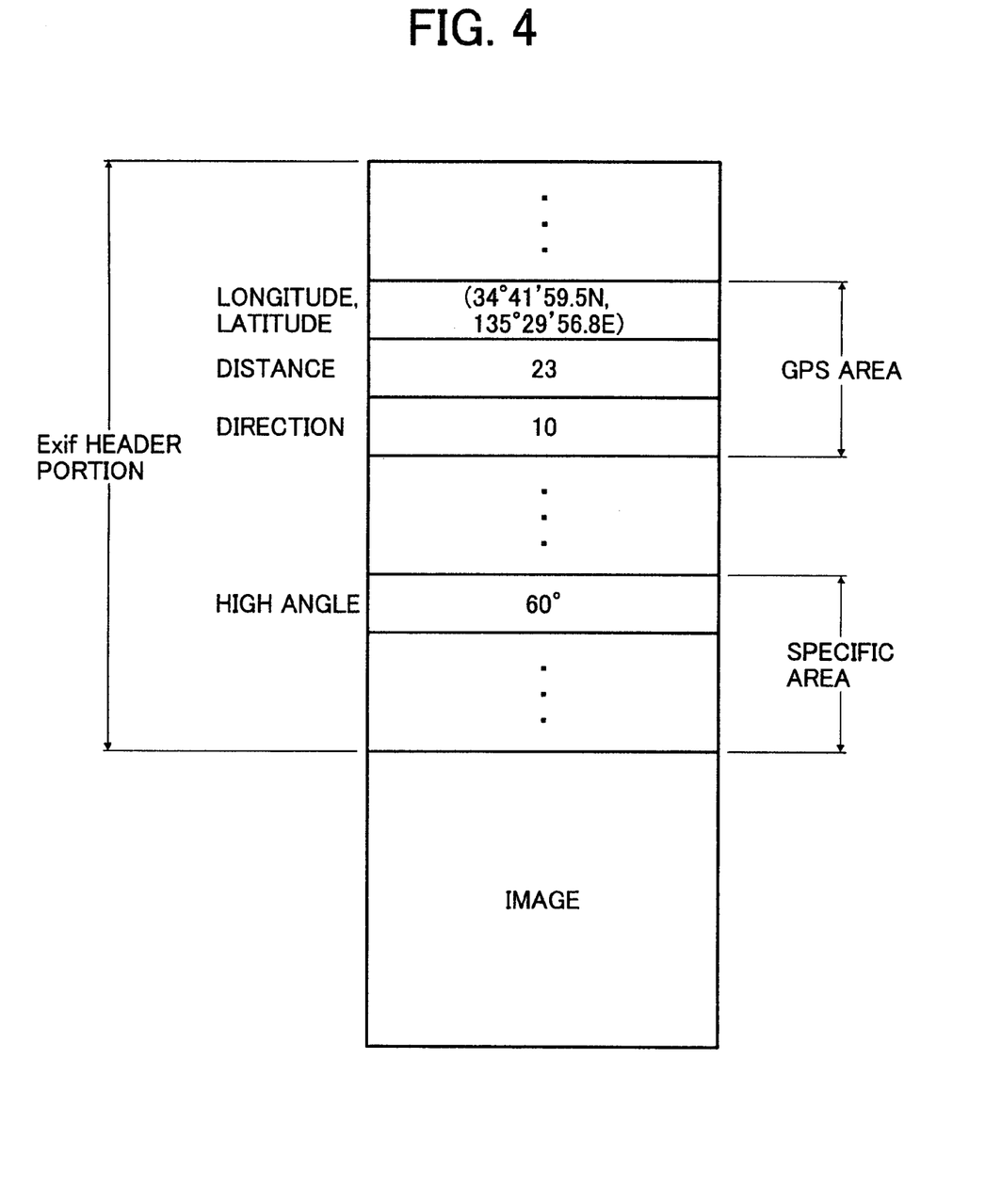
FIG. 4 is a schematic for explaining a data structure of a shot image.

FIG. 4 is a schematic for explaining image data that includes the Exif header portion and the image. The Exif header portion is header information complying with an Exif format. The Exif header portion includes a GPS area that is formed of a predefined field, and a specific area that is formed of a field that can be used freely by the user and by a third vendor.

In case of the subject calculation mode, a coordinate of the imaging subject location, calculated in the imaging subject location calculation unit 303, is recorded in a field of longitude/latitude of the GPS area in the Exif header portion, and in case of the no subject calculation mode an image coordinate, acquired by the information acquiring unit 301 and stored in the SDRAM 13, is recorded in the field of longitude/latitude of the GPS area in the Exif header portion.

The imaging subject distance, acquired by the information acquiring unit 301 and stored in the SDRAM 13, is recorded in a field of subject distance of the GPS area in the Exif header portion and the imaging subject orientation, acquired by the information acquiring unit 301 and stored in the SDRAM 13, is recorded in a field of subject orientation of the GPS area in the Exif header portion.

Further, the imaging subject high-angle, acquired by the information acquiring unit 301 and stored in the SDRAM 13, is recorded in a high-angle field of the specific area in the Exif header portion.

Referring back to FIG. 3, when the subject calculation mode is stored as the setting mode in the flash memory 14, the display control unit 307 displays the shooting location, the imaging subject distance, the imaging subject orientation, and the imaging subject angle in the operation displaying unit 16. When any one of the following, that is, the shooting location, the imaging subject orientation, and the imaging subject distance, is not stored in the flash memory 14 at the time of calculating the imaging subject location, the display control unit 307 displays a message of non-availability of necessary information, and a message of conducive to selecting the recording mode is displayed on the operation displaying unit 16.

Further, when either of the imaging subject distance or the imaging subject angle is not stored in the flash memory 14 at the time of calculating a distance correction, the display control unit 307 displays a message of non-availability of necessary information and a message of conducive to selecting the recording mode is displayed on the operation displaying unit 16. Moreover, the display control unit 307 displays various types of screens on the operation displaying unit 16.

The input control unit 306 is a processing unit that receives set-up screens displayed on the operation displaying unit 16 by the user and selection of various screens done by the user. For example, the input control unit 306 receives selection of either the subject calculation mode or the no subject calculation mode as the recording mode from the set-up screen.

Following is an explanation regarding a possibility of an input of the set-up screen such as a set-up screen displayed by the display control unit 307.

Figure 5:
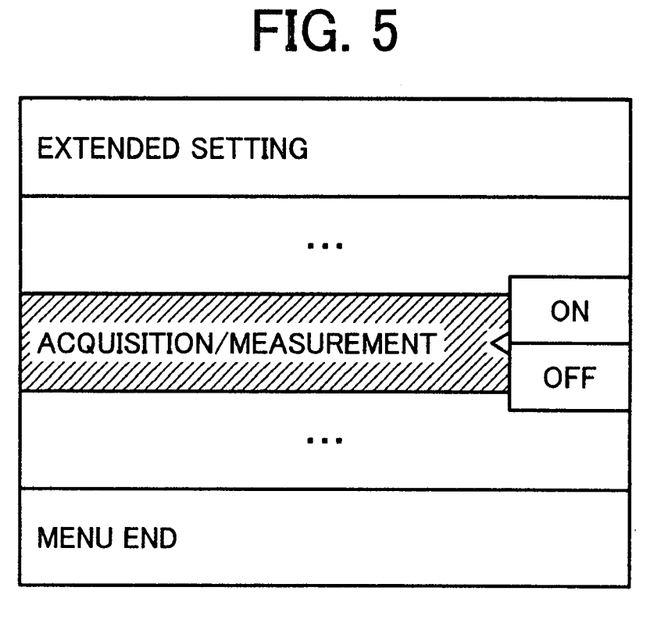
FIG. 5 is a schematic for explaining an example of a setup screen for specifying a usage of a function of acquiring location information from a GPS and measuring functions of various equipments.

FIG. 5 is a schematic for explaining an example of a setup screen for specifying a usage of a function of acquiring location information from the GPS and measuring functions of various equipments. A setting of "acquisition/measuring" displayed on the set-up screen is for specifying, whether a function of acquiring location information from the GPS and measuring functions of various equipments are used or not, and any one of the above can be selected by using "on", or "off". Such specification is stored in the flash memory 14 as the setting information indicative of whether a function of acquisition/measuring is used or not.

Figure 6:
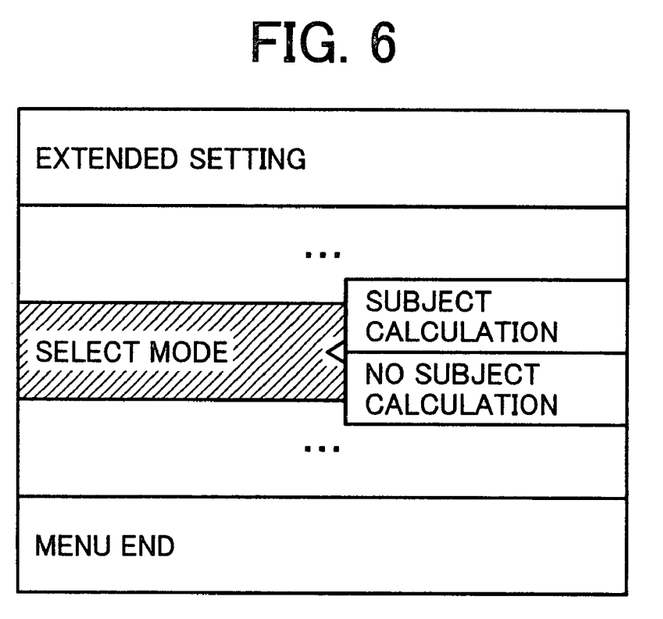
FIG. 6 is a schematic for explaining an example of a setup screen for inputting a setting of a recording mode.

FIG. 6 is a schematic for explaining an example of a setup screen for inputting a setting of a recording mode. As shown in FIG. 6, when a mode selection is specified, selection of the subject calculation mode is displayed as "subject calculation" and selection of the no subject calculation mode is displayed as "no subject calculation", and any one of the two can be specified. The mode selected here is stored in the flash memory 14 as the setting information.

Figure 7:
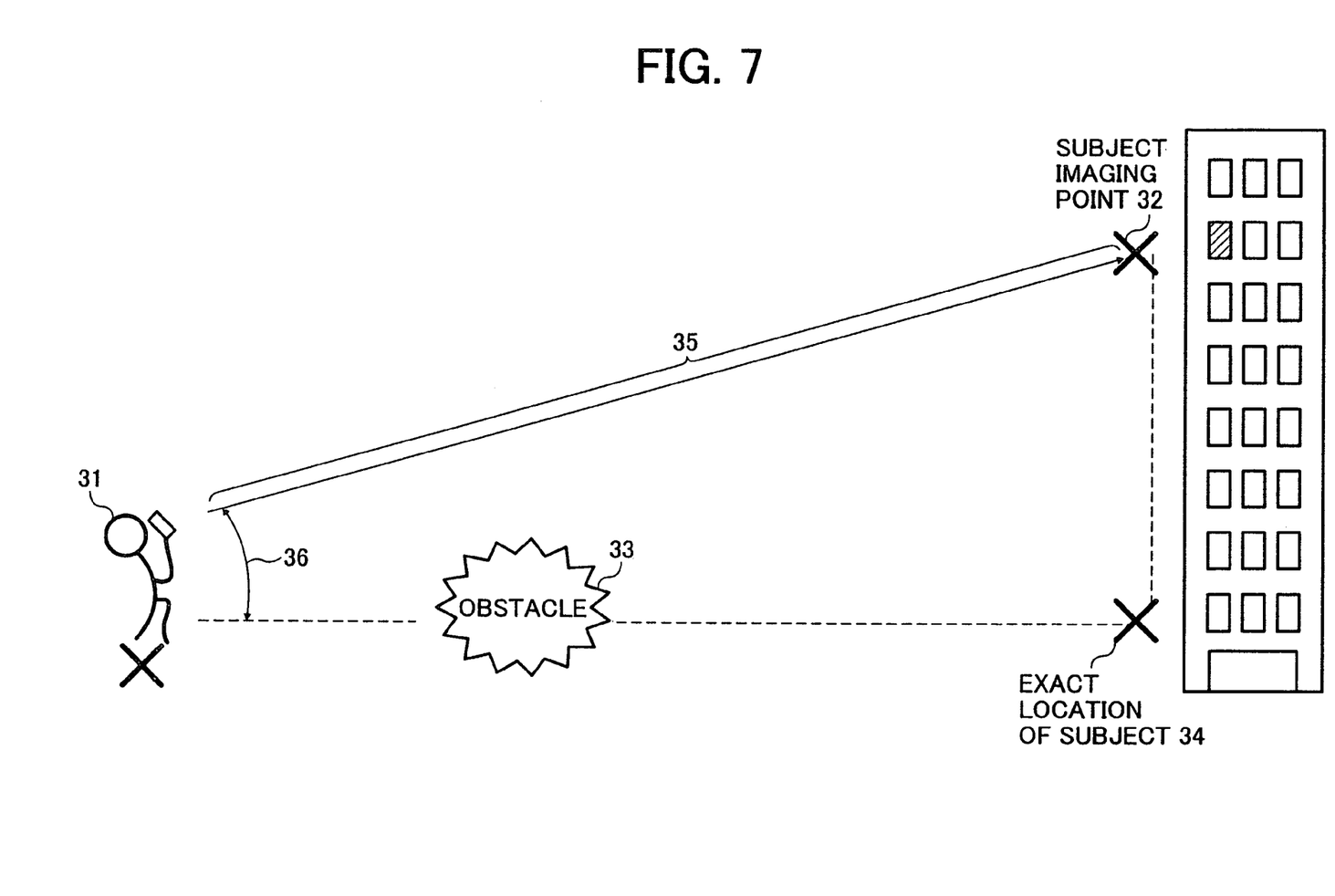
FIG. 7 is a schematic for explaining a positional relationship between a user (a photographer) and an imaging subject.

FIG. 7 is a schematic for explaining a positional relationship between a user (a photographer) and an imaging subject. A photographer 31 is attempting to take the image of the imaging subject, i.e., a subject imaging point 32; however, due to an obstacle 33 it is not possible to get closer to the imaging subject. The photographer 31 wishes to record a correct location of the imaging subject on to the image.

For this purpose, information about a correct imaging subject location 34 is needed to be acquired by the digital camera 1 according to the present embodiment, that is, the location information of the photographer 31, and resultant measurements of an imaging subject distance 35, the imaging subject orientation, and a high-angle 36, from the photographer 31 to the subject imaging point 32, are to be acquired. Next, using four of the resultant measurements, the digital camera 1 calculates the correct imaging subject location 34, and records into a header portion of the image data.

To reduce the burden on the digital camera 1 at the time of taking the image, it is possible to just record four measurement results in the header portion of the image at the time of taking the image, and the image data can be transferred to a personal computer for calculating the correct imaging subject location 34.

Thus, it is possible to record the correct location of the subject or information that can be used to calculate the correct location of the subject into the Exif header portion of the image data, even when the photographer 31 is not able to get closer to an imaging point of the imaging subject.

Figure 8:
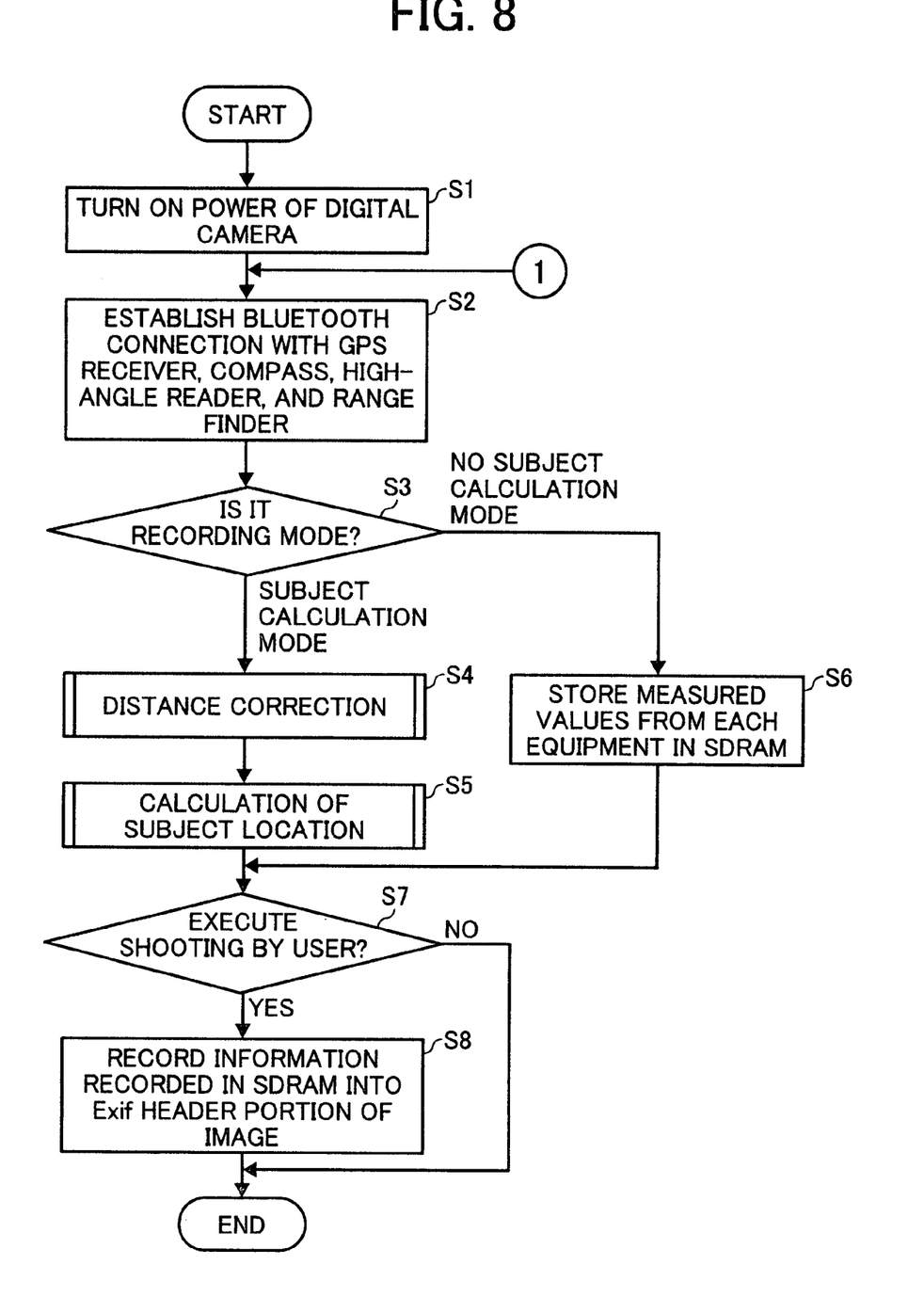
FIG. 8 is a flowchart of a process by the digital camera according to the present embodiment.

FIG. 8 is a flowchart of a process by the digital camera 1 according to the present embodiment. The photographer 31 turns on the power of the digital camera 1 (step S1). After being started, the digital camera 1 is connected to the GPS receiver 2, the electronic compass 3, the high-angle gauge 4, and the range finder 5 (step S2).

The digital camera 1 is connected to various measuring equipments, that is, the GPS receiver 2, the electronic compass 3, the high-angle gauge 4, and the range finder 5, through Bluetooth (registered trademark), thus the connection with the measuring equipments is started at step S2. When the connection is completed normally, the information acquiring unit 301 of the digital camera 1 starts acquiring resultant measurement information from each of the measuring equipments. The resultant measurement information is transmitted periodically from various measuring equipments, for example after every second.

The imaging subject location calculation unit 303 of the digital camera 1 confirms current recording mode by referring to the setting information in the flash memory 14 (step S3).

When the recording mode is set to the no subject calculation mode, the distance correcting unit 302 of the digital camera 1 executes the process of distance correction (step S4), and the imaging-subject-location calculating unit 303 executes the process of calculating the location of the imaging subject by calculating correction distance as the imaging subject distance (step S5). When the imaging subject high-angle acquired from the high-angle gauge 4 is zero degree or when the imaging subject high-angle is not acquired from the high-angle gauge 4, it is possible to execute the imaging-subject-location calculating process without executing the distance correction process.

At step S3, when the recording mode is set to the imaging subject location no calculation mode, the information acquired from various measuring equipments (the shooting location, the imaging subject distance, the imaging subject orientation, and the imaging subject high-angle) is stored in the SDRAM 13 (step S6).

When the photographer 31 takes the image with the digital camera 1 (Yes at step S6), the information recording unit 304 records the information stored in the SDRAM 13, (the shooting location, the imaging subject distance, the imaging subject orientation, and the imaging subject high-angle), in the header portion of the image data, and stores the image data in the flash memory (step S8). When the information acquired from various measuring equipments, (the shooting location, the imaging subject distance, the imaging subject orientation, and the imaging subject high-angle), is not stored in the SDRAM 13, nothing is recorded in the header portion of the image data.

Figure 9:
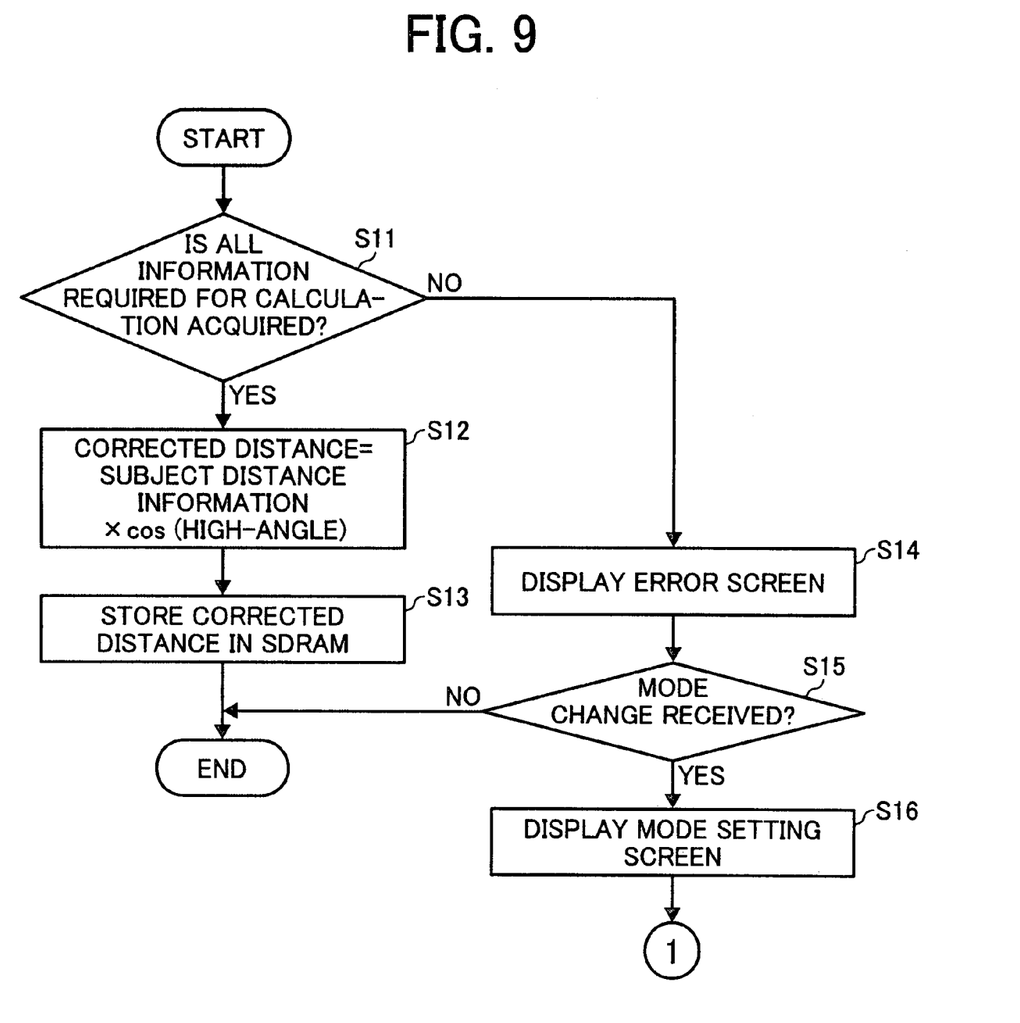
FIG. 9 is a flowchart of a distance correction process.

FIG. 9 is a flowchart of a distance correction process. The distance correcting unit 302 confirms, by referring to the SDRAM 13, whether all the information required for calculating correction distance, (the subject distance and the imaging subject high-angle), is acquired or not (step S11). When all required information is gathered (Yes at step S11), correction distance is calculated (step S12), and calculated correction distance is stored into the SDRAM 13 as the imaging subject distance (step S13).

Figure 10:
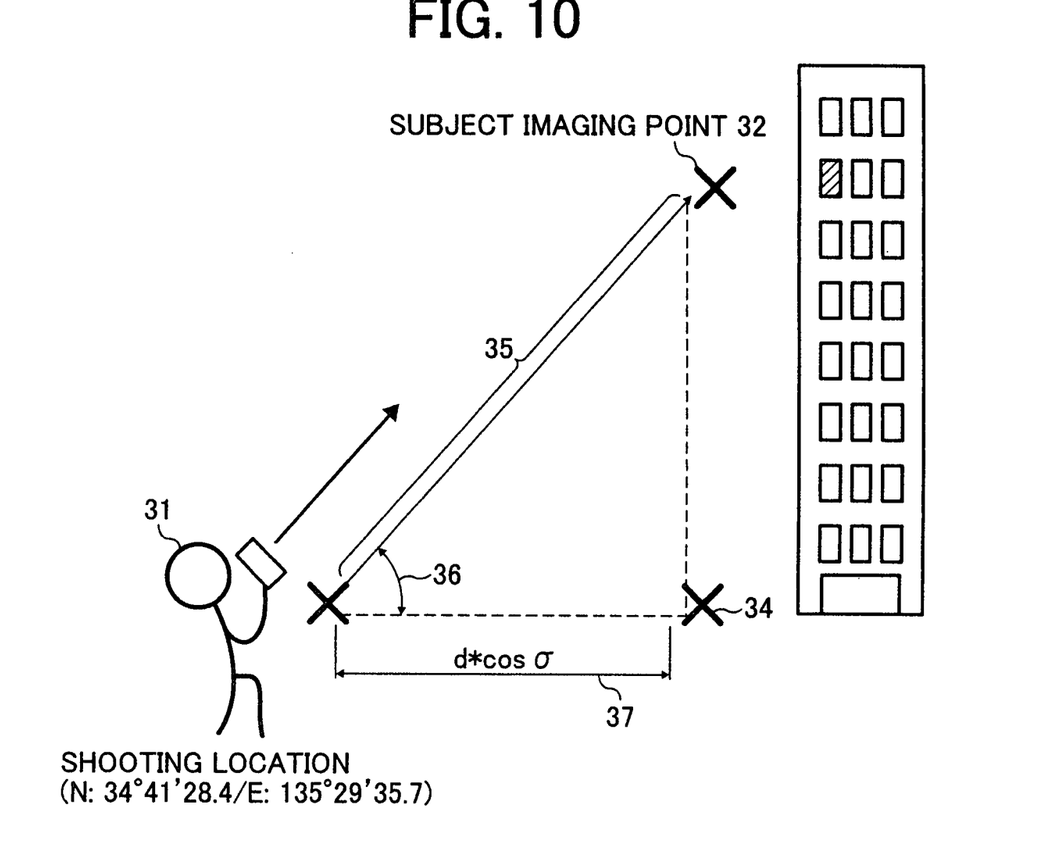
FIG. 10 is a schematic for explaining a method of calculating a correction distance.

The calculation of the correction distance is done according to the following explanation. FIG. 10 is a schematic for explaining a method of calculating the correction distance. As shown in FIG. 10, when the imaging subject is a tall building, and the image is taken, with the digital camera 1, of a higher floor in the building, and when the range finder 5 also acquires the distance from the same direction, an angle is formed between acquired subject distance and a horizontal distance from an imaging place to the imaging subject, the building. The photographer 31 wants to record a coordinate of the imaging subject location in the header portion of the image data. When a distance from the imaging place up to the higher floor of the imaging subject is taken as the imaging subject distance, it is not possible to get a correct coordinate of the imaging subject location, and it is necessary to use the horizontal distance from the imaging place to the imaging subject, the building, as the correction distance of the imaging subject distance. Therefore, the correction distance is calculated by the distance correcting unit 302, from the imaging subject distance acquired from the range finder 5.

As shown in FIG. 10, if the imaging subject distance 35 between the photographer 31 and the subject imaging point 32 is d (the imaging subject distance acquired from the range finder 5), and if the high-angle 36 acquired from the high-angle gauge 4 is σ, a correction distance 37 is calculated by $$\text{Correction distance} = d \times \cos \sigma$$

The correction distance calculated in such manner is used as a corrected imaging subject distance in a following imaging-subject-location calculating process.

At step S11, when the information required for calculating the correction distance is not acquired (No at step S11), the display control unit 307 displays a message of insufficient information and an error screen that displays possibility of a mode change choice on the operation displaying unit 16 for notifying the user (step S14).

Figure 11:
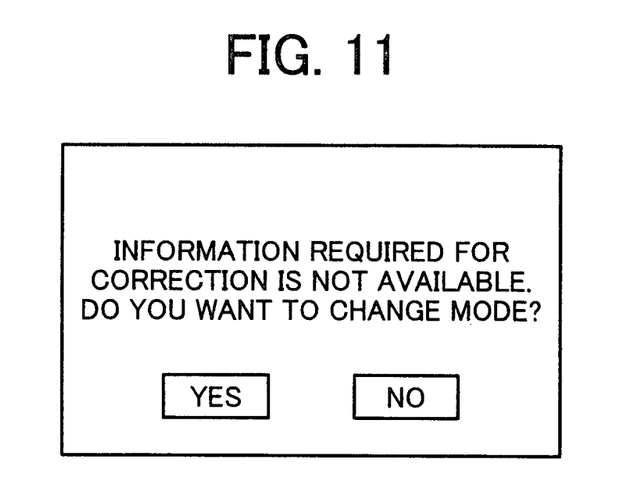
FIG. 11 is a schematic for explaining an example of an error screen.

FIG. 11 is a schematic for explaining an example of an error screen. As shown in FIG. 11, contents of the display of the error screen are, "information required for correction is not available", and "choice of mode selection". When "yes" is selected, and input of mode change is received (Yes at step S15), the mode selection screen as shown in FIG. 6, is displayed on the operation displaying unit 16 by the display control unit 307 (step S16), and the process reverts to step S2.

When "no" is selected and input of mode change is not received (No at step S15), the process is ended.

At step S14, the display of non-availability of the information is not to be considered limited to the error screen in FIG. 10. For example, when the digital camera 1 acquires the imaging subject distance, and the imaging subject high-angle, it is possible to display the acquired information on a monitor screen of the operation displaying unit 16, and when the information is not acquired nothing is displayed on the monitor screen.

Figure 12:
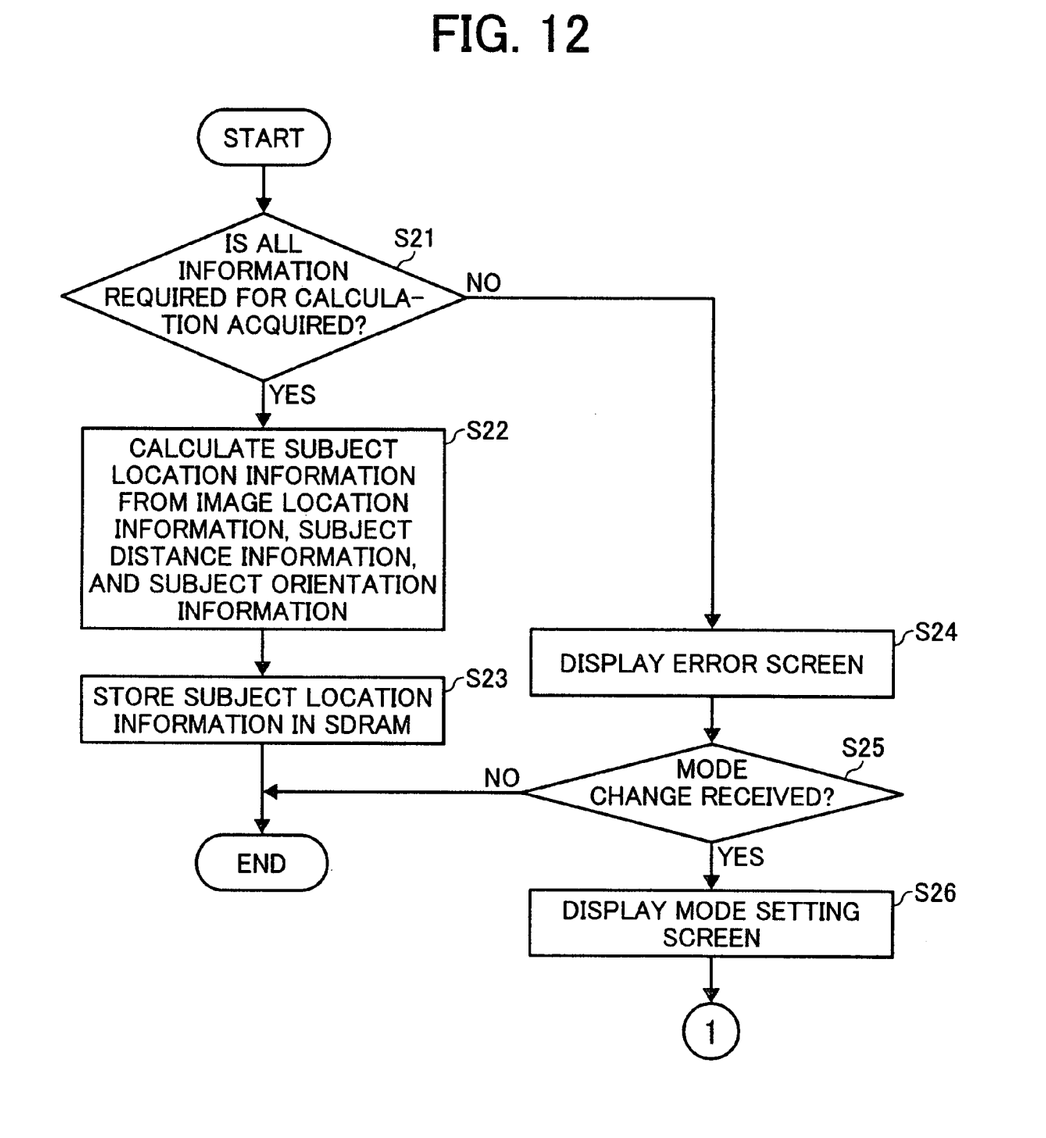
FIG. 12 is a flowchart of an imaging-subject-location calculating process.

Following is an explanation regarding the imaging subject location calculation process of step S5. FIG. 12 is a flowchart of an imaging-subject-location calculating process.

The imaging-subject-location calculating unit 303, at first, confirms by referring to the SDRAM 13, whether all the information required for calculating the subject location, (the shooting location, the imaging subject distance, and the imaging subject orientation), is acquired or not (step S21). When the required information is gathered (Yes at step S21), the imaging subject location is calculated (step S22), and calculated imaging subject location is stored in the SDRAM 13 (step S23).

Figure 13:
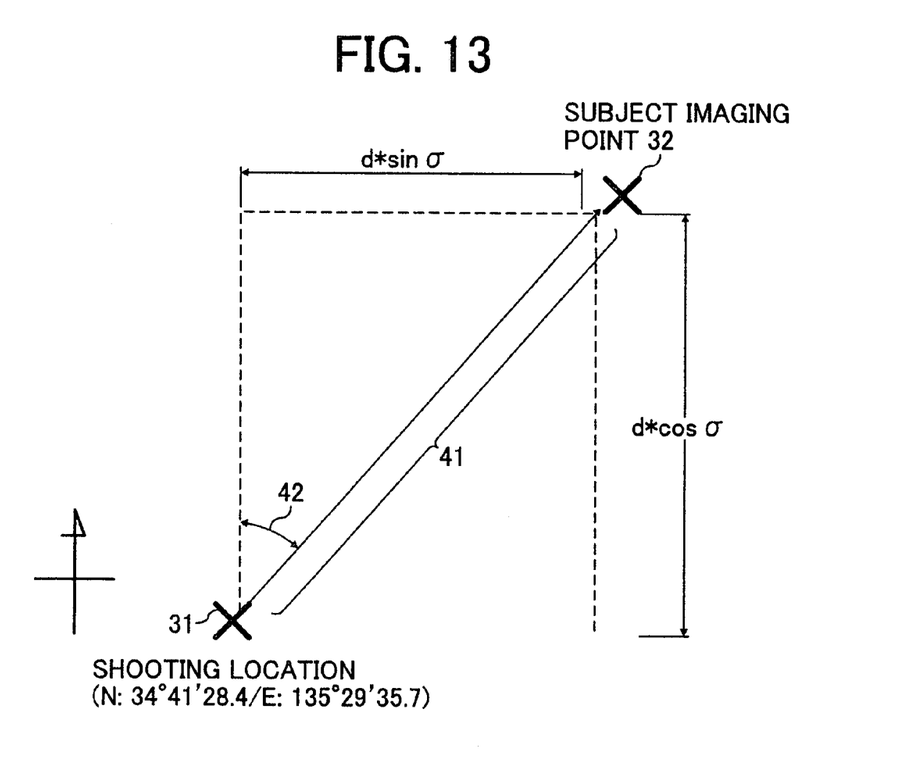
FIG. 13 is a schematic for explaining a method of calculating the imaging subject location.

FIG. 13 is a schematic for explaining a method of calculating the imaging subject location.

As shown in FIG. 13, if an imaging subject distance (the correction distance) 41 between the photographer (imaging point) 31 and the subject imaging point 32 after correction is d, a direction angle 42 is α, then the longitude and latitude value of the location of the subject imaging point 32, which is called the coordinate value, can be derived by adding d×Sin α, d×Cos α to each of longitude and latitude of the imaging location (the imaging location acquired from the GPS receiver 2) of the photographer (the imaging point) 31. The calculated coordinate value of the imaging subject location is stored in the SDRAM 13 as the imaging subject location.

At step S21, when the information required for calculating the imaging subject location is not gathered (No at step S21), the display control unit 307 displays the error screen on the operation displaying unit 16, a message that the information is not sufficient and an error screen that displays possibility of input of a mode change choice for notifying the user (step S24).

When "yes" is selected from the error screen in FIG. 11, and mode change input is received (Yes at step S25), the mode selection screen is displayed on the operation displaying unit 16 by the display control unit 307, as shown in FIG. 6, (step S26), and the process reverts to step S2.

When "no" is selected from the error screen in FIG. 11, and mode change input is not received (No at step S25), the process is ended.

The method of displaying non availability of information at step S14 is not considered to be limited to the error screen display in FIG. 10. For example, when the digital camera 1 is acquiring the shooting location, the imaging subject distance and the imaging subject orientation, the acquired information is displayed on the image monitor screen of the operation displaying unit 16, and when the information is not acquired nothing is displayed on the monitor screen.

When calculation of the imaging subject location does not occur in the digital camera 1 it is possible to calculate the imaging subject location in a personal computer or a portable information terminal that takes in the image by using the shooting location, the imaging subject orientation, and the imaging subject distance in the Exif header portion of the image data. Thus, it is possible to reduce the burden on the CPU 11 of the digital camera 1 at the time of taking the image.

Figure 14:
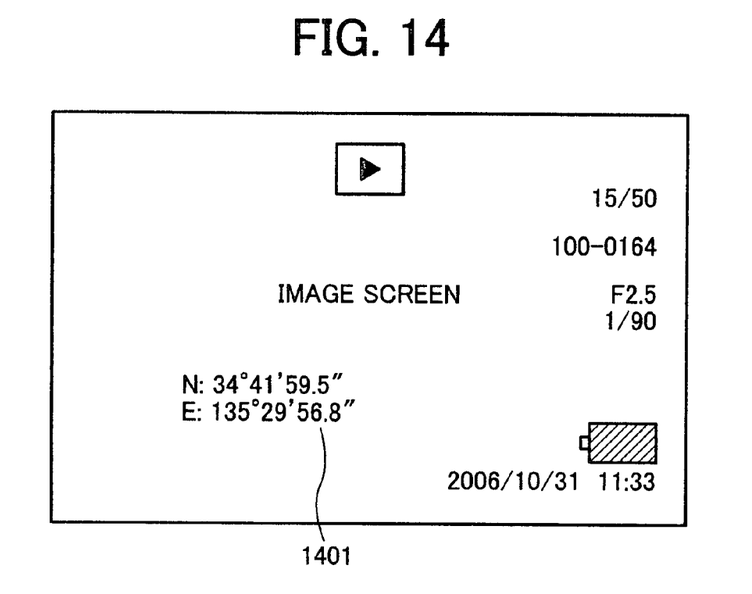
FIG. 14 is a schematic for explaining an example of shot image data including the imaging subject location displayed on an operation displaying unit.

Thus, when the image is displayed in the liquid display part of the operation displaying unit 16 by the display control unit 307, the imaging subject location, recorded in the Exif header portion of the image data is displayed along with the image data and other Exif data (such as ISO and exposure). FIG. 14 is a schematic for explaining an example of shot image data including the imaging subject location displayed on the operation displaying unit 16. As shown in FIG. 14 it is possible to get an idea of the display of the imaging subject location (longitude, latitude) 14201 calculated from the shooting location, along with the image and other Exif data (such as ISO and exposure).

The imaging subject location can use the image data in the Exif header portion for various applications. For example, the image data in the Exif header portion can be used in a map image application to display the location information in the map image. When image data is to be displayed in the map display application, conventionally, location coordinate of a shooting location is recorded in the header portion of the image data, therefore, the location displayed on the image data of the map image is not the location coordinate of the actual subject, however, it is the location coordinate of the shooting location.

However, in the digital camera 1 according to the present embodiment, the imaging subject location calculated from the shooting location, the imaging subject distance, the imaging subject orientation, the imaging subject high-angle is recorded in the Exif header portion, therefore, the location displayed in the image data of the map image is in the form of location coordinate of the actual imaging subject.

Figure 15:
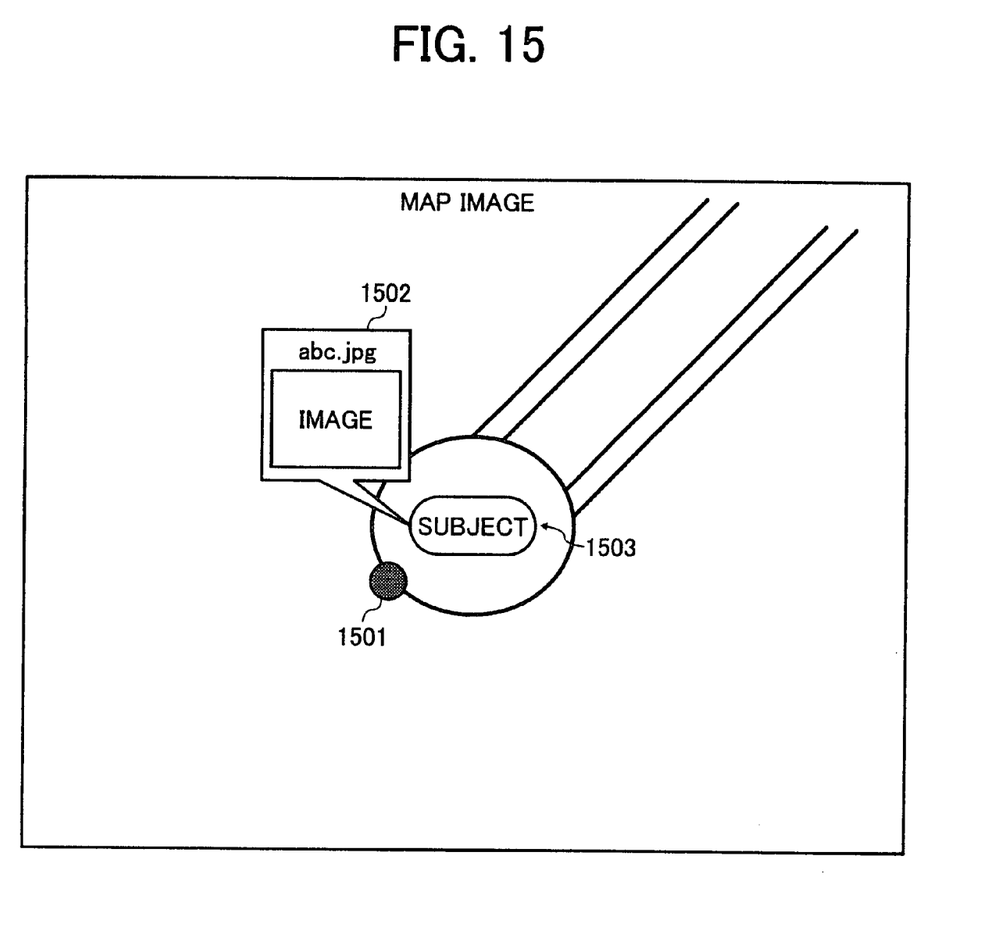
FIG. 15 is a schematic for explaining an example of the image data of the shot image created by the present embodiment, displayed using a map display application.

FIG. 15 is a schematic for explaining an example of the image data of the shot image created by the present embodiment, displayed using a map display application. As shown in FIG. 15, in the Exif header portion of the image data of an image 1502, the location recorded is of an imaging subject 1503, and not a shooting location 1501, therefore, the image 1502 is displayed in the image together with the location coordinate of the imaging subject 1503.

Thus, because the imaging subject location recorded in the Exif header portion is calculated from the shooting location, the imaging subject distance, the imaging subject orientation, and the imaging subject high-angle, it is possible to ascertain the correct location of the imaging subject even when, the location is such that it is not possible to get closer to the imaging subject.

It is possible to delete the distance correcting process for reducing the cost of the entire system. In this case, the system according to the present embodiment can comprise only the digital camera 1, the GPS receiver 2, the electronic Compass 3, and the range finder 5, and the high-angle gauge 4 are not required, thus, linking to reduction in the cost of the entire system.

An imaging program executed by the digital camera 1 according to the present embodiment is provided by being installed in the ROM 12 in advance.

The imaging program executable by the digital camera 1 of the present embodiment can be stored in computer-readable recording media such as a compact disk-read only memory (CD-ROM), a flexible disk (FD), a compact disk-recordable (CD-R), and a digital versatile disk (DVD) in the form of an installable and executable file.

The imaging program executable by the digital camera 1, according to the present embodiment, can be stored on a computer connected to networks such as the Internet and the likes and can be distributed or downloaded via a network such as the Internet.

The imaging program executable by the digital camera 1, according to the present embodiment, is a module configuration that includes various parts (such as the information acquiring unit 301, the distance correcting unit 302, the imaging-subject-location calculating unit 303, the information recording unit 304, the mode control unit 305, the input control unit 306, and the display control unit 307). The imaging program executable by the digital camera 1, according to the present embodiment, can be read and executed by the hardware such as the CPU 11 via the ROM 12, and the respective units mentioned above can be loaded on to and realized by the main storing device.

Although the present invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
a storing unit configured to store therein information;
a shooting-location acquiring unit that acquires a current location of the imaging device from a location detecting device that detects the current location, and stores acquired current location in the storing unit as a shooting location;
a distance acquiring unit that acquires a distance between a subject and the current location from a distance measuring unit that measures the distance, and stores acquired distance in the storing unit as an imaging subject distance;
an orientation acquiring unit that acquires an orientation of the subject with respect to the current location as a reference from an orientation measuring device that measures the orientation, and stores acquired orientation in the storing unit as an imaging subject orientation;
a subject-location calculating unit that calculates an imaging subject location that is a location of the imaging subject, based on the shooting location, the imaging subject distance, and the imaging subject orientation;
an information recording unit that records a shot image with calculated imaging subject location;
a high-angle acquiring unit that acquires a high-angle between the current location and the imaging subject from a high-angle measuring device that measures the high-angle, and stores acquired high-angle in the storing unit as an imaging subject high-angle;
a distance correcting unit that calculates a horizontal distance from the imaging subject distance and the imaging subject high-angle, as a correction distance wherein the subject-location calculating unit calculates the imaging subject location by taking the correction distance as the imaging subject distance;
an operation displaying unit that displays the shot image with a plurality of screens for various settings, and receives an input of a command from a user; and
a display control unit that displays the imaging subject location on the operation displaying unit;
a setting-information storing unit configured to store therein a recording mode for the imaging subject location;
an input control unit that receives a selection of a calculation mode in which the imaging subject location is calculated or a no calculation mode in which the imaging subject location is not calculated from the operation displaying unit by the user as the recording mode; and
a mode control unit that stores selected recording mode in the setting-information storing unit, wherein
when the calculation mode is stored in the setting-information storing unit, the subject-location calculating unit calculates the imaging subject location.

2. The imaging device according to claim 1, wherein the information recording unit records the shot image in the image storing unit further with the shooting location, the imaging subject distance, the imaging subject orientation, and the imaging subject high-angle.

3. The imaging device according to claim 1, wherein when the no calculation mode is stored in the setting-information storing unit, the subject-location calculating unit does not calculate the imaging subject location.

4. The imaging device according to claim 3, wherein when the no calculation mode is stored in the setting-information storing unit, the display control unit displays the shooting location, the imaging subject distance, the imaging subject orientation, and the imaging subject high-angle on the operation displaying unit.

5. The imaging device according to claim 1, wherein the subject-location calculating unit determines whether all of the shooting location, the imaging subject orientation, and the imaging subject distance are stored in the storing unit, and
when any one of the shooting location, the imaging subject orientation, and the imaging subject distance is not stored in the storing unit, the display control unit displays a message indicating insufficient information on the operation displaying unit.

6. The imaging device according to claim 5, wherein when any one of the shooting location, the imaging subject orientation, and the imaging subject distance is not stored in the storing unit, the display control unit further displays a message prompting to select the recording mode on the operation displaying unit, and
the mode control unit stores the selected recording mode in the setting-information storing unit.

7. The imaging device according to claim 1, wherein the distance correcting unit determines whether all of the imaging subject distance and the imaging subject high-angle are stored in the storing unit, and
when any one of the imaging subject distance and the imaging subject high-angle is not stored in the storing unit, the display control unit displays a message indicating insufficient information on the operation displaying unit.

8. The imaging device according to claim 7, wherein when any one of the imaging subject distance and the imaging subject high-angle is not stored in the storing unit, the display control unit displays a message prompting to select the recording mode on the operation displaying unit, and
the mode control unit sets the selected recording mode in the setting-information storing unit.

* * * * *